(12) United States Patent
Ono (10) Patent No.: US 8,029,161 B2
(45) Date of Patent: Oct. 4, 2011

(54) LIGHTING APPARATUS (75) Inventor: Keisuke Ono, Chigasaki (JP)

(73) Assignees: Toshiba Lighting & Technology Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 187 days.

(21) Appl. No.: 12/424,582

(22) Filed: Apr. 16, 2009

(65) Prior Publication Data

US 2009/0262538 A1 Oct. 22, 2009

(30) Foreign Application Priority Data

Apr. 18, 2008 (JP) ................... 2008-109445
Mar. 17, 2009 (JP) ................... 2009-064937

(51) Int. Cl.
*F21V 21/26* (2006.01)

(52) U.S. Cl. ......... 362/269; 362/285; 362/287; 362/288

(58) Field of Classification Search .................. 362/269, 362/285, 287, 288, 282, 311.02, 471, 490
See application file for complete search history.

(56) References Cited

U.S. PATENT DOCUMENTS

| 3,803,400 A | 4/1974 | Ozawa |
| 4,142,227 A | 2/1979 | Aikens |
| 5,377,087 A | 12/1994 | Yoon |
| 5,404,297 A | 4/1995 | Birk |
| 2007/0070639 A1 | 3/2007 | Tiesler |

FOREIGN PATENT DOCUMENTS

| DE | 38 20 894 | 12/1989 |
| EP | 1 174 307 | 1/2002 |
| JP | 2005-149790 | 6/2005 |
| JP | 2006-156238 | 6/2006 |
| WO | WO 2007-149778 | 12/2007 |

OTHER PUBLICATIONS

English Abstract of JP-2005-149790.
English Language translation of JP-2005-149790.
Search report issued in counterpart European application No. 09 005 433.9 dated Aug. 12, 2009.
English abstract of JP 2006-156238.
English language translation of JP 2006-156238.

*Primary Examiner* — Evan Dzierzynski
(74) *Attorney, Agent, or Firm* — DLA Piper LLP (US)

(57) ABSTRACT

A reading light incorporates a light fitting containing a light source, a light main body and a spring. The cover of the light fitting includes an outer surface formed of a part of a spherical surface. The body of the light fitting is formed of a metal, and includes a back surface formed of another part of the spherical surface. The light main body includes a receiving/guiding portion that supports the outer surface. The receiving/guiding portion supports the light fitting so that the light fitting is rotatable, thereby enabling the direction of light emitted from the light fitting to be changed. The light fitting is fitted in the light main body by pressing the back surface using the spring. Either the receiving/guiding portion or cover is formed of a metal, and the other is formed of a resin.

3 Claims, 5 Drawing Sheets

LIGHTING APPARATUS

CROSS-REFERENCE TO RELATED APPLICATIONS

This application is based upon and claims the benefit of priority from prior Japanese Patent Applications No. 2008-109445, filed Apr. 18, 2008; and No. 2009-064937, filed Mar. 17, 2009, the entire contents of both of which are incorporated herein by reference.

BACKGROUND OF THE INVENTION

1. Field of the Invention

The present invention relates to a lighting apparatus capable of changing its light emission direction, and more specifically, a lighting apparatus, such as a reading light, attached to, for example, a seat in transportation means, such as railroad wagons, airplanes and ships.

2. Description of the Related Art

As a lighting apparatus of this type, a down light is known in which, for example, a light fitting of a substantially spherical shape is rotatably held by a substantially cylindrical light main body, thereby enabling the direction of light emission to be changed (see, for example, Jpn. Pat. Appln. KOKAI Publication No. 2005-149790). When assembling the down light, the light fitting is mounted on the edge of a circular opening that is formed in the light main body by narrowing the inner periphery of the body, and then a plate spring is attached to the light fitting from behind to press it against the edge of the opening.

With this structure, the light fitting is held stationary by the frictional force exerted between the edge of the circular opening of the light main body and the spherical outer surface of the light fitting, and that of the back surface of the light fitting and the plate spring. Further, when an external force is applied to the light fitting to change its orientation, the outer surface of the light fitting is slid along the edge of the circular opening, with the result that the orientation of the light fitting is changed. By virtue of this structure, the emission direction of an LED contained in the light fitting can be changed.

In this type of lighting apparatus, the outer surface of the light fitting is slid along the edge of the circular opening of the light main body when the orientation of the light fitting is changed. However, the above-mentioned publication has no description concerning problems that may occur after such sliding is again and again repeated during long-term use.

Further, the publication describes that the light main body having the circular opening is a resin molded product or an aluminum die-cast product, but does not describe the material of each component of the light fitting. Namely, it is unclear what types of materials are used for the sliding portions of the light main body and light fitting.

If the sliding portions of the light main body and light fitting are both metal members, the following problem will be raised. In general, to smooth the sliding, the outer surface of the light fitting is coated with another metal. However, the metal coating is gradually worn away while the orientation of the light fitting is repeatedly changed. When abrasion of the coated layer has advanced, the metal ground layers of the two components are exposed and brought into direct contact with each other. At this time, galling of the ground layers occurs to degrade the sliding performance, with the result that it becomes difficult to smoothly change the orientation of the light fitting.

In contrast, if the sliding portions of the light main body and the light fitting are both resin members, the coefficient of dynamic friction therebetween is relatively low, and hence the light fitting can slide relatively smoothly during its rotation. However, in this case, the coefficient of static friction is relatively high. Therefore, when the light fitting is in a static condition, it is hard to smoothly start the rotation of the same without harsh frictional noise. Further, it is known that the degree of friction between resin members changes in accordance with the ambient temperature, and that the higher the temperature, the greater the coefficient of static friction.

Moreover, when the light main body and the light fitting are both resin members, the heat dissipation performance is degraded. Namely, since resins have much lower heat conductivity than metals, if the light fitting is formed of a resin, the heat produced by the LED of the fitting cannot be efficiently dissipated. This being so, to obtain heat dissipation performance sufficient to maintain the emission efficiency of the LED, it is necessary to make the light fitting large. This is another problem.

BRIEF SUMMARY OF THE INVENTION

It is an object of the preset invention to provide a lighting apparatus having good heat dissipation performance, and capable of maintaining, over a long period of time, the operability of a light fitting (i.e., easiness of changing the orientation of the light fitting) incorporated therein.

To attain the object, there is provided a lighting apparatus comprising: a light fitting containing a light source and including a front portion with an outer surface, and a back portion with a back surface, the outer surface being a part of a spherical surface, the back surface being another part of the spherical surface; a receiving/guiding portion located in front of the light fitting, and receiving the light fitting kept in contact with the outer surface such that the light fitting is rotatable; and a spring which applies a pressing force to the back surface of the light fitting to press the outer surface of the light fitting against the receiving/guiding portion, wherein: the back portion is formed of a metal; and one of the receiving/guiding portion and the front portion of the light fitting is formed of a metal, and the other of the receiving/guiding portion and the front portion of the light fitting is formed of a resin.

In the invention constructed as above, since the receiving/guiding portion or the front portion of the light fitting is formed of a metal, and the other is formed of a resin, the sliding portions of the receiving/guiding portion and the front portion of the light fitting can smoothly slide relative to each other, thereby causing no galling thereon. Further, in the above invention, good operability of the light fitting can be maintained over a long period of time even if the angle of the light fitting is changed repeatedly. Furthermore, in the invention constructed as above, since the back portion of the light fitting, to which the light source is attached, is formed of a metal, the heat produced by the light source can be efficiently transmitted to the back portion, thereby enhancing heat dissipation performance.

For instance, when the receiving/guiding portion is formed of a resin, and the front portion of the light fitting is formed of a metal, the heat from the light source is transmitted not only to the back portion, but also to the front portion, as mentioned above. In this case, the heat from the light source can be efficiently dissipated by the entire light fitting, which enables the light fitting to be made compact. In contrast, when the receiving/guiding portion is formed of a metal, and the front portion of the light fitting is formed of a resin, the front portion of the light fitting is prevented from being excessively heated, whereby an operator is protected from burn injury when the operator touches the front portion and changes the angle of the light fitting.

Further, the lighting apparatus of the invention may further comprise a contact member interposed between the back surface and the spring. When, for example, the contact member secured to the spring is made to contact the back surface, it can smoothly slide on the back surface, thereby enabling excellent sliding to be maintained or a long period of time. Also when the contact member secured to the back surface is made to contact the spring, the same advantage as the above can be expected.

The lighting apparatus of the invention may further comprise a stopper which limits the movement of the light fitting before the spring is deformed permanently, when the light fitting is moved backward against the pressing force of the spring. In this case, the spring that elastically deforms when the light fitting is pushed backward can be protected, whereby the frictional force applied to the light fitting can be maintained constant for a long period of time.

The lighting apparatus of the invention may also comprise an angle limiting unit which covers at least part of the outer surface and the receiving/guiding portion, the angle limiting unit limiting the range of rotation of the light fitting within the zone defined by a preset angle. In this case, the receiving/guiding portion is arranged in a position in which portion of the outer surface, which slide on the receiving/guiding portion when the light fitting is rotated within the zone defined by the preset angle, are prevented from being seen from the front of the lighting apparatus, regardless of the angle of the light fitting.

After the receiving/guiding portion and the front portion of the light fitting are repeatedly slid on each other, abrasion occurs on the outer surface of the front portion, which is a part of a spherical surface, and the outer surface gets filthy. If, for example, the front portion is formed of a resin, relatively large abrasion marks may be formed thereon. If, on the other hand, the front portion is formed of a metal, fine abrasion occurs on the outer surface of the front portion, and particles of the resin receiving/guiding portion caused by the friction between itself and the metal front portion stick to the abrasion marks of the front portion. As a result, the outer surface will have, for example, black stains due to sliding. It is not preferable that sliding stains causing disfigurement are exposed and seen from the front of the lighting apparatus.

In the invention, the receiving/guiding portion is positioned so that the sliding portion of the outer surface of the front portion, on which the receiving/guiding portion slides, cannot be seen from the front regardless of the angle of the light fitting. Therefore, even when the light fitting is rotated to the maximum, the sliding portion of the outer surface of the front portion is prevented from exceeding the zone limited by the angle limiting unit to be exposed to the outside of the lighting apparatus. This being so, even if sliding stains are formed on the outer surface of the light fitting, they can be prevented from being seen from the front of the lighting apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Referring to FIGS. 1 to 6, a reading light 1 as a lighting apparatus according to an embodiment of the invention will be described.

Figure 1:
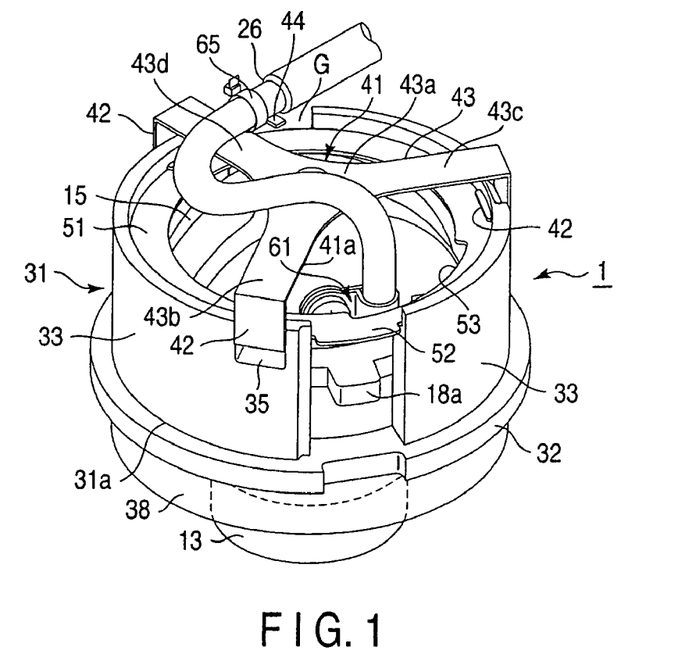
FIG. 1 is a perspective view illustrating the rear portion of a reading light as a lighting apparatus according to an embodiment of the invention, in which light an angle limiting section is removed.
Figure 2:
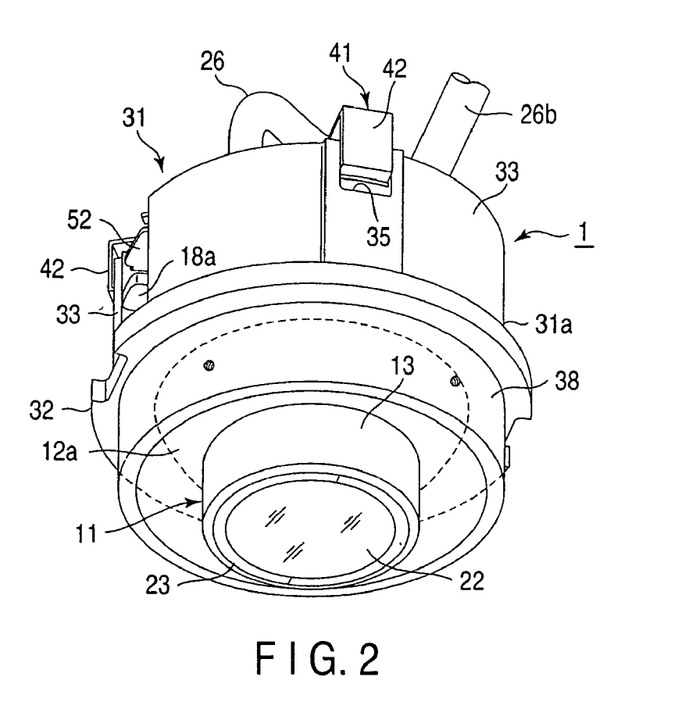
FIG. 2 is a perspective view illustrating the front portion of the reading light of FIG. 1, in which the angle limiting section is removed.
Figure 3:
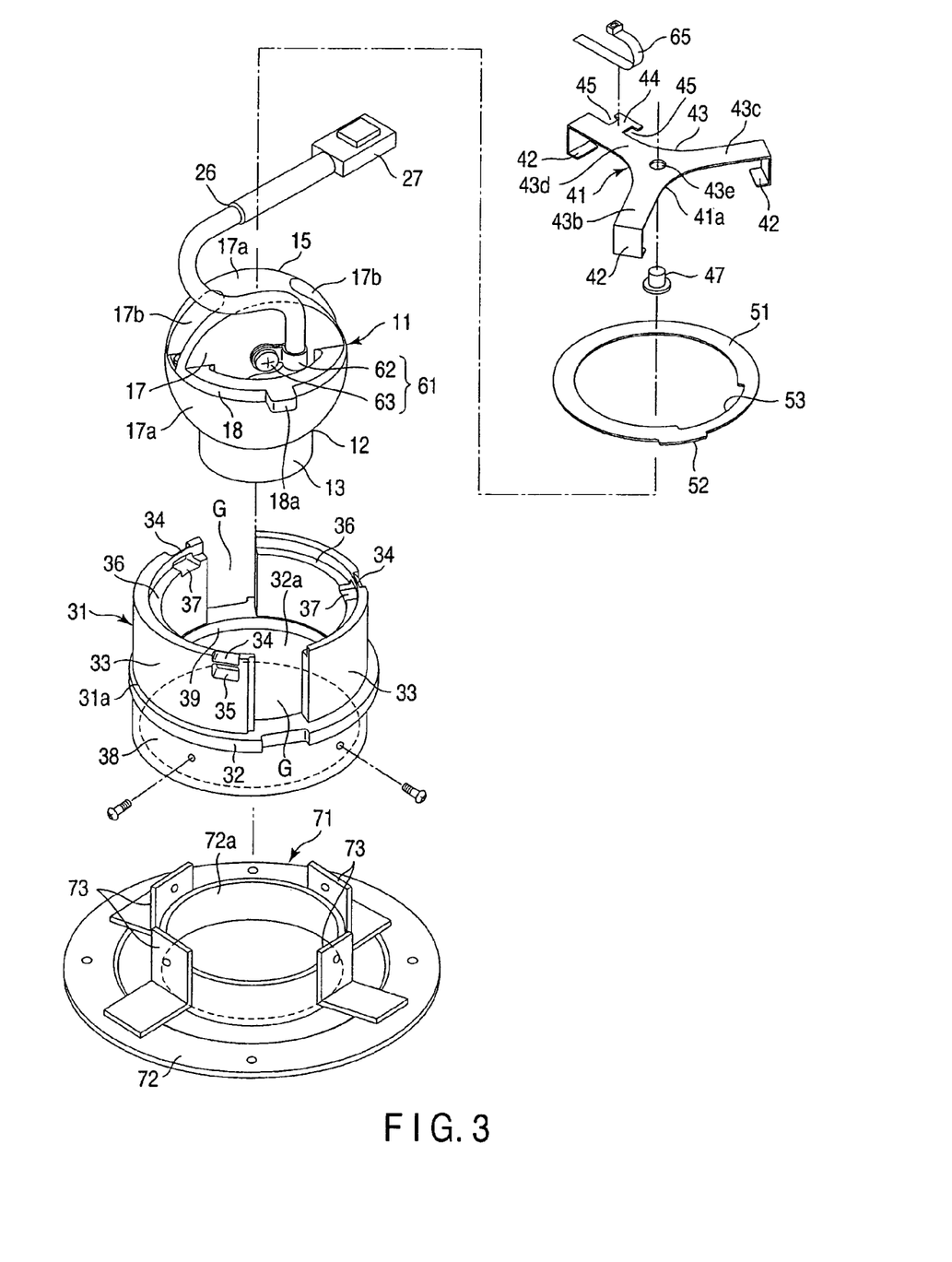
FIG. 3 is an exploded perspective view illustrating the reading light of FIG. 1.

FIG. 1 is a perspective view illustrating the structure of the rear portion of the reading light 1, FIG. 2 is a perspective view illustrating the structure of the front portion of the reading light 1, and FIG. 3 is an exploded perspective view illustrating the reading light 1. Further, FIG. 4 is a sectional view taken along the axis of the reading light 1, FIG. 5 is a sectional view taken along line V-V of FIG. 4, and FIG. 6 is an exploded sectional view illustrating the reading light 1.

The reading light 1 is attached to a seat in passenger transportation means, such as railroad wagons, airplanes and ships, or provided near the seat. The reading light 1 is used to apply spot light to a position near a user, and has a structure for slightly changing the angle of the spot light.

Figure 4:
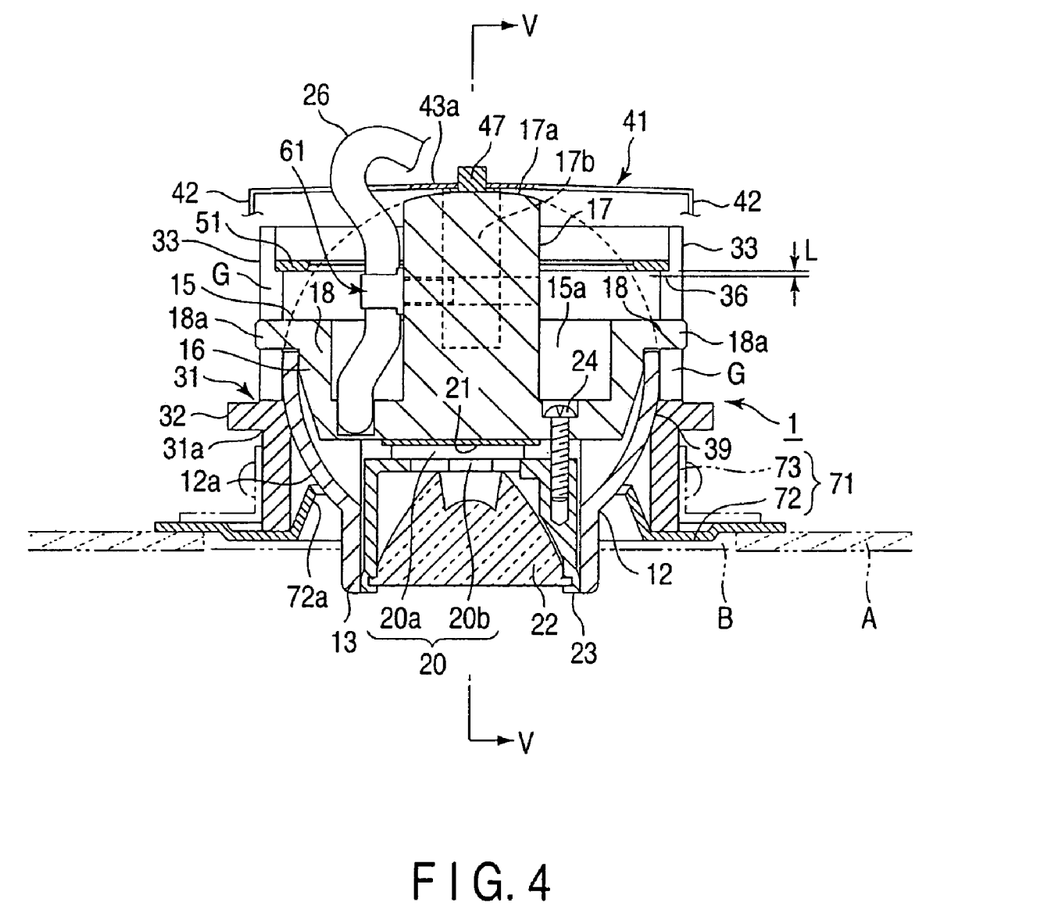
FIG. 4 is a sectional view taken along the axis of the reading light shown in FIG. 3.
Figure 5:
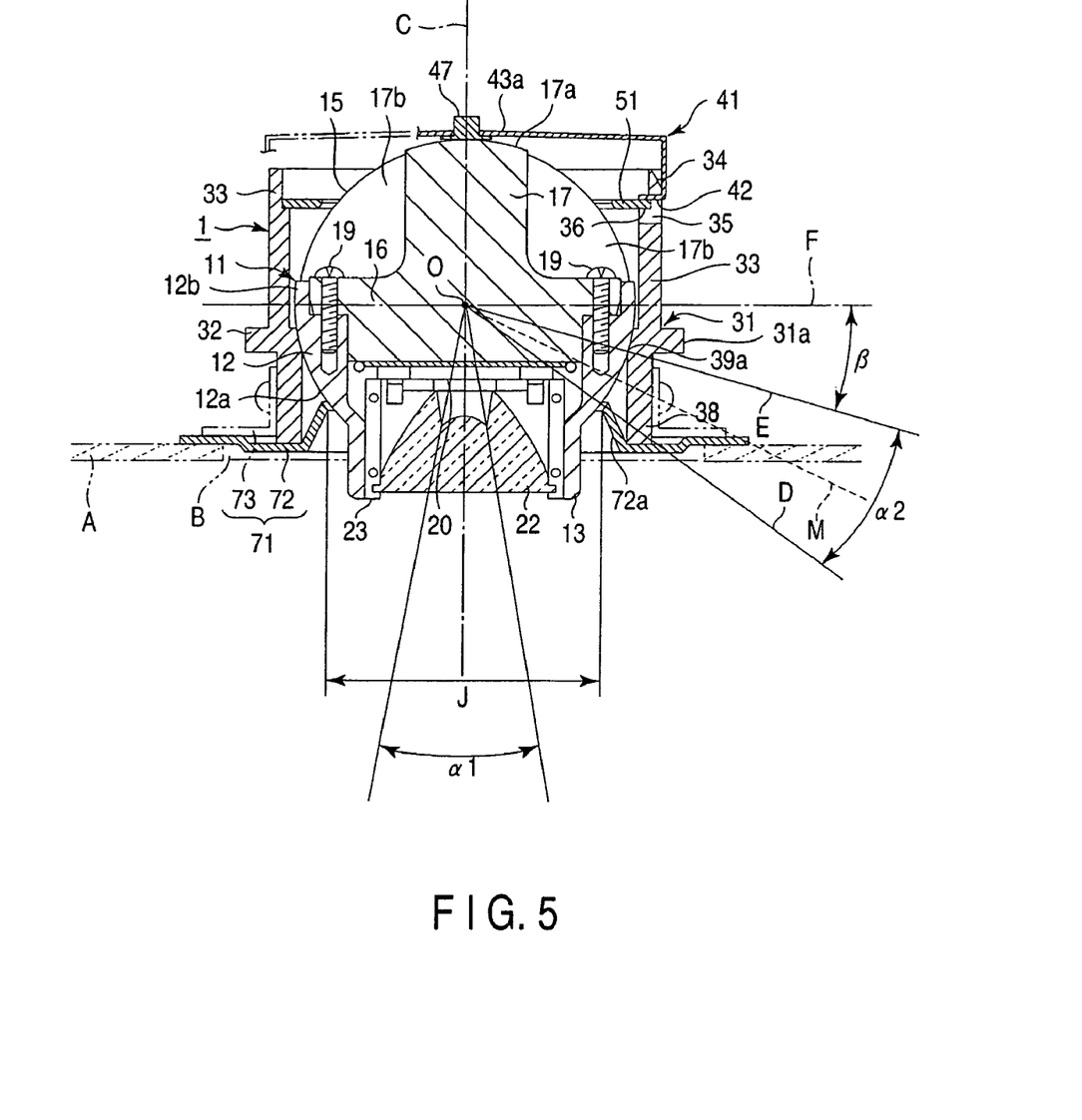
FIG. 5 is a sectional view taken along line V-V of FIG. 4.
Figure 6:
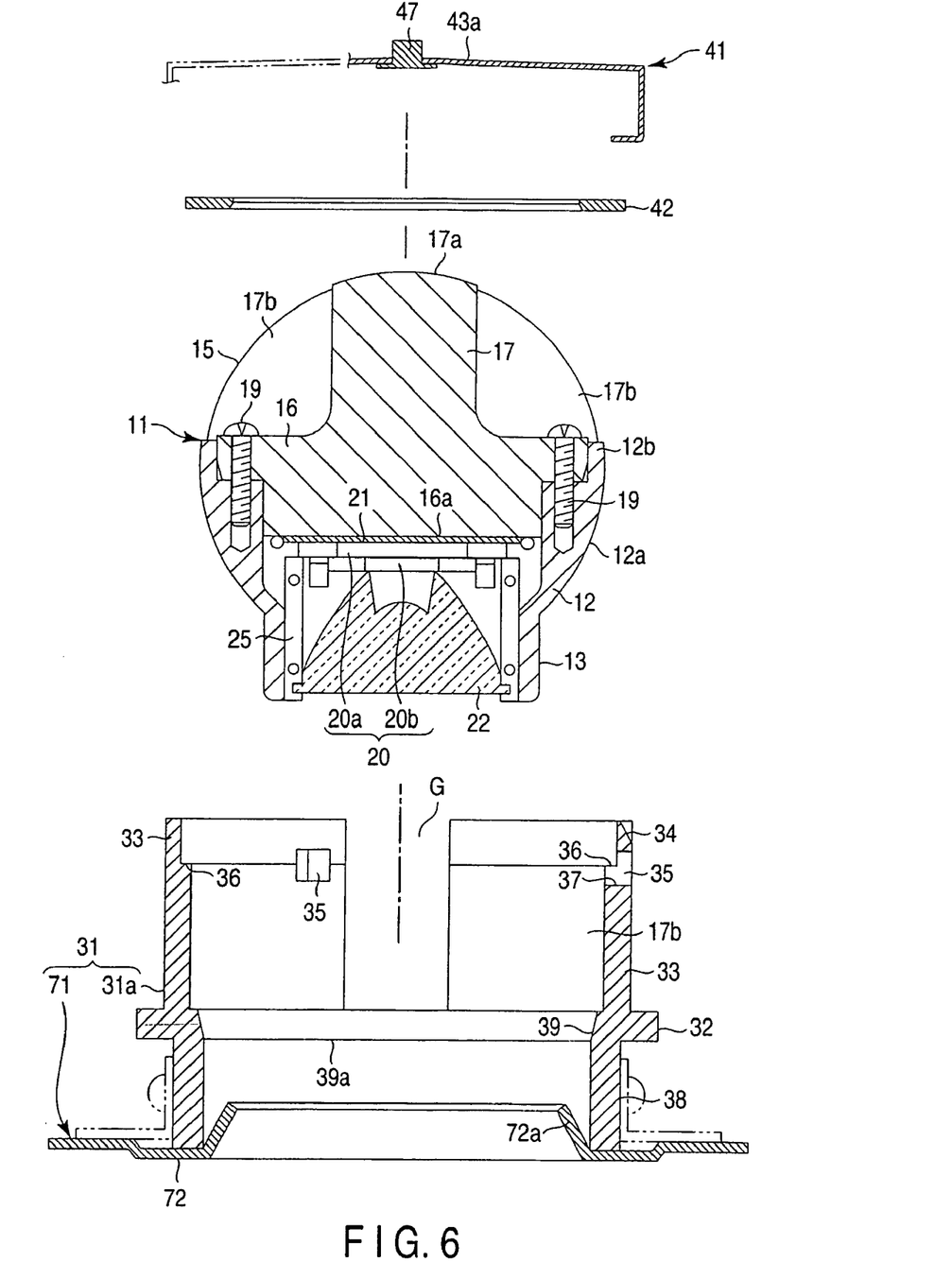
FIG. 6 is an exploded sectional view illustrating the reading light shown in FIG. 5.

As shown in FIGS. 4 and 5, an attachment member A for the reading light 1 is formed of, for example, a metal plate with a through hole B. The attachment member A is used for attaching the reading light 1 to transportation means.

The reading light 1 comprises a light fitting 11, an electrical cable 26, a light main body 31, a spring 41 and a stopper 51. The electrical cable 26 is coated with an insulating material. The spring 41 is a metal plate spring having, for example, such a shape as shown in FIG. 3.

As shown in FIGS. 3 to 6, the light fitting 11 includes a cover 12 (front portion), a light fitting body 15 (rear portion), a light source 20 and a lens 22.

The cover 12 forms the front portion of the light fitting 11, and has a part of spherical portion 12a (hereinafter referred to simply as "the outer surface 12a") as the front portion of the cover, and a cylindrical portion 13 outwardly projecting from the central portion of the outer surface 12a. The outer surface 12a and the cylindrical portion 13 are formed integral with each other. Namely, the cover 12 is shaped like a china bowl. In the embodiment, the cover 12 including the outer surface 12a and the cylindrical portion 13 formed integral with the outer surface 12a is formed of poly butadiene terephthalate (PBT) that is lightweight, excellent in heat resistance, and relatively inexpensive.

The end of the cylindrical portion 13 away from the outer surface 12a, i.e., the front end, is open, and the end (rear end) of the cover 12 opposite to the cylindrical portion 13 is also open. The rear open end of the cover 12 is located slightly behind the maximum diameter portion (that intersects an intersection line F described later) of the outer surface 12a. Namely, the outer diameter of an open end 12b (see FIG. 5) extending from the portion intersecting the intersection line F to the rear open end is gradually reduced toward the back of the light fitting 11.

The light fitting body 15 provides the rear portion of the light fitting 11, and is formed by casting a metal, preferably, aluminum or an alloy of aluminum that is lighter than iron and has a higher thermal conductivity than iron. In the embodiment, the light fitting body 15 is formed by aluminum die-casting. The light fitting body 15 includes a body base 16, a back projection 17 and a pair of arcuate portions 18, which are formed integral with each other as one body.

The body base 16 is to be inserted in the cover 12 from the rear open end thereof, and its insertion-side end, i.e., the front end 16a (see FIG. 6) of the body base 16, is formed flat.

The back projection 17 projects from the back of the body base 16. The opposite sides of the back projection 17 substantially perpendicular to the body base 16 are substantially parallel to each other. The back surface 17a of the back projection 17 that connects the opposite sides thereof forms a part of a spherical surface. Further, a pair of grooves 17b substantially parallel to the opposite sides are formed in the back projection 17. The grooves 17b are separate from each other with the top of the back projection 17 interposed therebetween, thereby defining the back surface 17a.

The pair of arcuate portions 18, only one of which is shown in FIG. 3, each have a shape obtained by cutting a substantially annular member into two portions. The shown arcuate portion 18 has its opposite ends connected integral with one side of the back projection 17, and outwardly projects from one side of the back projection 17. Similarly, the other arcuate portion 18 outwardly projects from the other side of the back projection 17.

When the pair of arcuate portions 18 are coupled to the light fitting body 15 and the cover 12, they are in contact with the rear open end of the cover 12. Projections 18a are provided on the respective outer surfaces of the central portions of the outwardly projected arcuate portions 18. The projections 18a project away from each other.

Further, as shown in FIG. 4, the light fitting body 15 includes a pair of recesses 15a formed between the arcuate portions 18 and the corresponding side surfaces of the back projection 17. To be more specific, the pair of recesses 15a are formed between the inner surfaces of the arcuate portions 18, the side surfaces of the back projection 17, and the back of the body base 16.

As described above, since the opposite sides of the back projection 17, the grooves 17b are formed in the back projection 17, and the recesses 15a are formed at the body base 16, the light fitting body 15 formed of a metal can be made lightweight. As a result, the light fitting 11 to be rotated as described later can be made lightweight, thereby reducing the entire reading light 1. Moreover, as described above, the pair of groove 17b and the pair of recesses 15a formed in the light fitting body 15 increases the surface area of the light fitting body 15, thereby enhancing the heat dissipation performance of the light fitting body 15.

The light fitting body 15 is engaged with the cover 12, and a pair of screws 19 are screwed into the cover 12 through the grooves 17 and the body base 16, as is shown in FIG. 5. When the light fitting body 15 is thus coupled to the cover 12, the outer surface 12a of the cover 12 and the back surface 17a of the back projection 17 form parts of one spherical surface.

As shown FIGS. 4 and 6, the light source 20 has a structure in which an LED (light-emitting diode) 20b that emits, for example, white light is mounted on a metal substrate 20a. The light source 20 is attached to the front end face 16a of the body base 16 with a heat conductive sheet 21 interposed therebetween.

The lens 22 is provided on the front surface of the light source 20. Namely, the lens 22 is positioned so that it can pass therethrough the light emitted from the LED 20b. The lens 22 is held in a substantially cylindrical lens holder 23 formed of a resin. The lens holder 23 comprises two holder members coupled into a substantially cylindrical shape. The two members of the lens holder 23 are inserted in the cylindrical portion 13 of the cover 12. The lens holder 23 is fastened to the light fitting body 15 by screws 24 (only one of which is shown in FIG. 4) that are inserted from inside the recesses 15a and then screwed into the screw fixing portions of the lens holder 23 through the body base 16.

By thus fastening the lens holder 23 to the light fitting body 15, the heat conductive sheet 21 can be brought into tight contact with the front end 16a of the body base 16, with the heat conductive sheet 21 and the substrate 20a stacked on each other and interposed between the lend holder 23 and the front end 16a. As a result, the heat produced by the LED 20b when it is lit can be efficiently transmitted to the front end 16a of the body base 16 through the heat conductive sheet 21.

Namely, efficient heat dissipation can be realized by forming the light fitting body 15, attached to the LED 20b as a heat reservoir, of a metal having a high heat conductivity, and forming the heat dissipation recesses 15a and grooves 17b in the light fitting body 15. This heat dissipation structure can effectively suppress increases in the temperature of the LED 20b, and can maintain the light-emitting performance of the LED 20b for a long time.

Although part of the heat transmitted to the light fitting body 15 is also transmitted to the resin cover 12, the outer surface of the cylindrical portion 13, which is brought into contact with a user, can be prevented from increasing in temperature, since the cylindrical portion 13 is away from the light fitting body 15, and the resin lens holder 23 is provided inside the cylindrical portion 13.

The electrical cable 26 is used to supply power to the light source 20. One end of the electrical cable 26 is connected to a power-supply patterned film (not shown), passed along the bottom of one of the recesses 15a of the light fitting body 15, as is shown in, for example, FIG. 4. The other end of the electrical cable 26 is connected to an electrical connector 27 as shown in FIG. 3.

The light main body 31 is assembled by coupling an angle limiting unit 71 to the front portion of a substantially cylindrical body 31a. The cylindrical body 31a is formed of a metal, preferably, aluminum or an alloy of aluminum that is lighter than iron and has a higher thermal conductivity than iron. In the embodiment, the cylindrical body 31a is formed by aluminum die-casting.

More specifically, as shown in FIGS. 1 to 6, the cylindrical body 31a has an annular portion 32 at its axial center. A pair of arcuate walls 33 are formed integral with the rear end of the annular portion 32. Further, a cylindrical wall 38 is formed integral with the front end of the annular portion 32. As shown in FIG. 6, a receiving/guiding portion 39 is formed integral with the inner surface of the cylindrical body 31a at a position corresponding to the annular portion 32. Although in this embodiment, the receiving/guiding portion 39 is provided at the position corresponding to the annular portion 32, it is not always necessary to provide the same at this position.

The receiving/guiding portion 39 is provided along the entire circumference of the inner surface of the cylindrical body 31a, and has an annular tapered surface that is gradually reduced in diameter toward the front-side cylindrical wall 38. The front edge 39a (see FIG. 6) of the receiving/guiding portion 39, which has the smallest diameter, extends continuously from the inner surface of the cylindrical wall 38.

The diameter of the front edge 39a of the receiving/guiding portion 39 is smaller than the maximum diameter of the outer surface 12a of the cover 12 of the light fitting 11. Therefore, when the light fitting 11 is inserted into the cylindrical body 31a from behind, the outer surface 12a of the cover 12, which has substantially the maximum diameter, is held by the front edge 39a of the receiving/guiding portion 39. Thus, the receiving/guiding portion 39 (the front edge 39a) receives the outer surface 12a of the cover 12, thereby holding the light fitting 11 so that the light fitting 11 can slide. In other words, the receiving/guiding portion 39 is not brought into surface contact with the outer surface 12a of the cover 12, but only the smallest-diameter edge 39a of the receiving/guiding portion 39 is brought into substantial line contact with the outer surface 12a. The light fitting 11 thus held by the receiving/guiding portion 39 protrudes its cylindrical portion 13 from the front opening of the cylindrical wall 38 of the light main body 31.

As shown in FIG. 3, the arcuate walls 33 are opposed to each other with the light fitting 11 interposed therebetween. The circumferential edges of the arcuate walls 33 are opposed to each other with gaps G defined therebetween. These gaps G are circumferentially separate from each other by substantially 180 degrees. The width of the gaps G is wider than that of the projections 18a. By loosely engaging the projections 18a of the light fitting body 15 with the respective gaps G, slight rotation of the light fitting 11 relative to the light main body 31 is enabled.

At least one guide portion 34 and spring attachment hole 35 are formed in the rear end of each arcuate wall 33, which is away from the annular portion 32. Each guide portion 34 opens at the rear end of the corresponding arcuate wall 33. To be more specific, each guide portion 34 is formed in an outer surface portion of the corresponding arcuate wall 33, obliquely and outwardly from the rear end of the wall 33. Each spring attachment hole 35 is a rectangular hole formed through the corresponding arcuate wall 33, and located adjacent to the corresponding guide portion 34 and closer to the annular portion 32 than the guide portion 34.

Arcuate steps 36 are formed in respective inner surface portions of the arcuate walls 33 close to the rear ends of the walls 33. The arcuate steps 36 extend along the circumference of the arcuate walls 33. Each step 36 has a groove 37 that communicates with the corresponding spring attachment hole 35.

As shown in FIG. 3, the angle limiting unit 71 includes a limiting ring 72, and a plurality of brackets 73 fixed to the rear surface of the limiting ring 72. Each bracket 73 is obtained by bending a rectangular plate into a substantial L shape. For instance, the angle limiting unit 71 is fastened to the cylindrical wall 38 of the cylindrical portion 31a by screwing the brackets 73 to the outer surface of the cylindrical wall 38 of the cylindrical body 31, with the angle limiting unit 71 made to abut against the front end of the wall 38 as shown in FIG. 4.

The limiting ring 72 is attached to the peripheral portion of the through hole B from behind the aforementioned attachment member A, with the result that the reading light 1 is attached to the attachment member A, backwardly projecting therefrom, as is shown in FIGS. 4 and 5.

The inner peripheral surface 72a of the limiting ring 72 is tapered backwardly. Namely, the diameter of the limiting ring 72 is gradually reduced toward the rear side. The axial length of the inner peripheral surface 72a is shorter than that of the cylindrical wall 38 of the cylindrical body 31a, and is inserted into the body 31a from the front side thereof through the front opening of the cylindrical wall 38.

When the light fitting 11 is fitted into the light main body 31 with the limiting ring 72 attached to the cylindrical body 31a, the insertion-side end of the inner peripheral surface 72a, i.e., the small-diameter rear end, opposes the outer surface 12a of the cover 12 of the light fitting 11 and is kept out of contact with the same. Namely, when the light fitting 11 is seen from the front, the inner peripheral surface 72a of the limiting ring 72 covers part of the outer surface 12a of the light fitting 11, and the receiving/guiding portion 39 as an inner surface portion of the cylindrical portion 31a. In other words, the receiving/guiding portion 39 is located radially outside the rear end of the inner peripheral surface 72a, and radially outside the opening J (see FIG. 5) of the light main body 31.

The angle limiting unit 71 brings part of the limiting ring 72 into contact with the light fitting 11, thereby defining the turning angle α1 (see FIG. 5) of the light fitting 11. Specifically, when the light fitting 11 is rotated to be oriented leftward or rightward in FIG. 5, the outer surface of the cylindrical portion 13 of the cover 12 contacts the inner peripheral surface 72a of the limiting ring 72, thereby stopping the rotation of the light fitting 11. The receiving/guiding portion 39 is formed so that its front edge 39a is positioned within the zone defined by angle β shown in FIG. 5.

Referring now to FIG. 5, a description will be given of angle β set for the receiving/guiding portion 39.

As described above, using the front edge 39a, the receiving/guiding portion 39 serves to hold the light fitting 11 in the light main body 31 so that the light fitting 11 is angularly movable. The rear limit of the zone defined by angle β indicates a limit position at which the front edge 39a can hold the light fitting 11. If the front edge 39a is positioned rearward of this limit position, the light fitting 11 will pass through the receiving/guiding portion 39. Namely, it is necessary to slightly displace the rear limit toward the front side (i.e., displaced downwardly in FIG. 5) from intersection line F that passes through the center O of rotation of the light fitting 11 and intersects the axis C of the light main body 31 at right angles. Thus, the rear limit excludes positions on intersection line F.

The front limit (i.e., the lower limit in FIG. 5) of the zone defined by angle β is set so that the reading light 1 looks good when seen from the front.

Since the reading light 1 of the embodiment has a structure for enabling the light fitting 11 to be moved through angle α1, the contact portions of the front edge 39a of the receiving/guiding portion 39 and the outer surface 12a of the cover 12 scrape against each other, and the outer surface 12a gets filthy over time. Such stains may well be seen through the gap between the inner peripheral surface 72a of the limiting ring 72 and the cylindrical portion 13 of the cover 12, when the light fitting 11 is tilted. This degrades the appearance of the reading light 1.

Therefore, in the embodiment, to enable stains to be formed on portions of the reading light 1 that are not seen from the front, the front edge 39a of the receiving/guiding portion 39 is positioned in the zone defined by angle β. Roughly speaking, if the receiving/guiding portion 39 is positioned so that the front edge 39a holds the maximum-diameter portion of the cover 12 or the portion of the same close to the maximum-diameter portion, stains can be made difficult to be seen from the front.

For instance, when the light fitting 11 is shifted, by rightward swinging the cylindrical portion 13 of the cover 12 as shown in FIG. 5, from the home position shown in FIG. 5 in which the optical axis C of the light fitting 11 is oriented straightforward, to the position in which the cylindrical portion 13 contacts the inner peripheral surface 72a of the limiting ring 72, the front edge 39a scrapes the portion of the outer surface 12a that is limited by solid line E connecting the center O of rotation of the light fitting 11 to the contact portion of the front edge 39a and the outer surface 12a, and broken line M. As a result, the portion of the outer surface 12a limited by solid line E and broken line M gets filthy over time. The angle between lines E and M is half the above-mentioned turning angle α1.

Since the light fitting 11 cannot further be rotated in the same direction after the cylindrical portion 13 is brought into contact with the inner peripheral surface 72a, the portion of the outer surface 12a that falls outside the zone defined by lines E and M, regardless of the rotation (angular movement) of the light fitting 11, is not brought into contact with the front edge 39a. Namely, it is sufficient if the limit position M of stains is not seen from the front, regardless of the angle of the light fitting 11.

For example, when the light fitting 11 is rotated to a position, in which a stain formed on the portion of the light fitting 11 corresponding to the limit position M when the light fitting 11 is rotated rightward in FIG. 5 to the maximum degree can be seen at the highest probability, i.e., when it is greatly rotated leftward in FIG. 5 to bring the cylindrical portion 13 into contact the inner peripheral surface 72a, the position of the stain is moved to the position indicated by solid line D. At this time, the angle between the broken line M and the solid line D is half the above-mentioned turning angle α1. Namely, angle α2 defined between solid lines D and E is equal to angle α1 through which the light fitting 11 can move. Since the light fitting 11 cannot be further rotated leftward, the above-mentioned stain corresponding to the limit position M is not seen from the front, if the position, at which solid line D intersects the outer surface 12a of the cover 12, is not seen from the front.

Namely, if the front edge 39a of the receiving/guiding portion 39 is positioned so that the portion of the outer surface 12a hidden by the inner peripheral surface 72a when the light fitting 11 is in its home position is situated on the above-mentioned solid line D, any stains can be prevented from being seen from the front, regardless of the angle of the light fitting 11. More specifically, it is sufficient if the receiving/guiding portion 39 is positioned so that when the light fitting 11 is in the home position, the outer surface 12a contacts the front edge 39a at a position at least closer to the back side than the position (which intersects solid line E) backward, by angle α2 (=angle α1), of the position (which intersects solid line D) at which the outer surface 12a is hidden by the inner peripheral surface 72a.

The receiving/guiding portion 39 may be situated at any position if the front edge 39a is in the zone defined by angle β. In the embodiment, the front edge 39a is positioned on solid line E that indicates the lower end (in FIG. 5) of the zone defined by angle β. By positioning the receiving/guiding portion 39 at the lower (i.e., front) end of the zone closest to the front side of the reading light 1, the light fitting 11 can be reliably held, and the distance between the open end 12b of the cover 12 and intersection line F can be minimized.

The plate spring 41 includes the same number of fixing portions 42 as that of the spring attachment holes 35, and a pressing portion 43 coupling the fixing portions 42, as is shown in, for example, FIGS. 1 and 3.

The fixing portions 42 are provided preferably at circumferentially regular intervals, i.e., at an angular interval of, for example, 120°, and are L-shaped. The pressing portion 43 includes radially extending first to third arms 43b to 43d. In other words, the pressing portion 43 has a trifurcated shape. Namely, the fixing portions 42 are formed by bending the first to third arms 43b to 43d. The thus-formed plate spring 41 is inserted into the spring attachment holes 35 from outside to be engaged therewith, whereby it is attached to the light main body 31.

One of the arms, e.g., the third arm 43d, has an electric cable fixing portion 44 laterally projecting from the arm 43d (see FIGS. 1 and 3). The electric cable fixing portion 44 has a T-shape that has a depression 45 defined by itself and a side edge of the third arm 43d.

The central portion 43a of the pressing portion 43, i.e., the portion from which the first to third arms 43b to 43d branch, is provided with a contact member 47. Specifically, the contact member 47 is formed of a material that is lower in strength than the material of the light fitting body 15, and preferably has a lower frictional coefficient than the same. For instance, the contact member 47 is formed of a hard synthetic resin. The contact member 47 is slight-press-fitted in a hole 43e (see FIG. 3), formed in the central portion 43a, from the light fitting body side. The reverse surface of the central portion 43a of the contact member 47 is in contact with the spherical back surface 17a of the light fitting body 15.

The stopper 51 is, for example, a metal ring as shown in FIG. 3. A rotation stop projection 52 is formed integral with the outer periphery of the stopper 51, and has a width substantially equal to that of the above-mentioned gap G. The projection 52 is fitted in the gap G. A clearance groove 53 is formed in the inner periphery of the stopper 51. The clearance groove 53 is provided to avoid interference with the electrical cable 26 led to the outside of the light main body 31. As shown in FIGS. 4 and 5, the stopper 51 is contained in the light main body 31, supported by the step 36.

A description will now be given of the procedure of assembling, into the reading light 1, the light main body 31, the plate spring 41, the stopper 51 and the light fitting 11 beforehand assembled.

The beforehand assembled light fitting 11 includes the electrical cable 26 connected thereto. The electrical cable 26 is fixed to the light fitting body 15 by fixing means 61 shown in FIG. 3. The fixing means 61 comprises a cable holder 62 formed of a metal chip, and a screw 63 that fixes the cable holder 62 to a side surface of the back projection 17. The electrical cable 26 is inserted through the cable holder 62. In this state, the cable holder 62 is fastened by the screw 63, whereby it is plastically deformed to reduce the diameter thereof. As a result, the electrical cable 26 is held immovable relative to the cable holder 62. The electrical cable 26 is passed through the body base 16 to the light source 20.

When assembling the reading light 1, firstly, the projections 18a of the light fitting 11 are aligned with the gaps G of the light main body 31, and then the light fitting 11 is fitted into the light main body 31 from behind, with the cover 12 of the light fitting 11 set at the head. As a result, the front portion of the cover 12 including the cylindrical portion 13 is received inside the receiving/guiding portion 39 of the light main body 31, and the outer surface 12a of the light fitting 11 is brought into contact with the front edge (smallest-diameter edge) 39a of the receiving/guiding portion 39 to thereby hold the light fitting 11. At this time, the projections 18a are engaged with the respective gaps G.

In this state, the spherical back surface 17a of the back projection 17 backwardly projects from the arcuate wall 33. Further, in this state, the front end of the cylindrical portion 13 of the light fitting 11 passes through the limiting ring 72 of the angle limiting unit 71 of the light main unit 31, and projects to the outside of the angle limiting unit 71.

After the light fitting 11 is inserted in the light main body 31 as described above, the stopper 51 is mounted in the light main body 31 so that the clearance groove 53 opposes the electrical cable 26 led from the light fitting 11 toward the back of the light main body 31. At this time, the stopper 51 is placed on the steps 36 of the light main body 31, with the rotation stop projection 52 of the stopper 51 received in one of the gaps G.

As a result, the back projection 17 of the light fitting 11 is inserted within the stopper 51 out of contact therewith. Further, the stopper 51 is positioned backward along the axis C of the light main body 31 away from the arcuate portions 18 of the light fitting 11 by a distance L, as shown in FIG. 4. The distance L is provided for enabling an operator to move, by the hand, the light fitting 11 relative to the light main body 31.

After that, the plate spring 41 with the contact member 47 already attached thereto is attached to the light main body 31. At this time, the plate spring 41 is pressed against the light fitting 11 with the three fixing portions 42 of the plate spring 41 aligned with the guide portions 34 of the light main body 31. As a result, the fixing portions 42 are deformed to slide along the guide portions 34 and fit into the spring attachment holes 35, whereby the stopper 51 is held between the fixing portions 42 and the steps 36 and secured to the light main body 31, as shown in FIG. 5. Namely, in the embodiment, when the plate spring 41 is attached to the light main body 31, the stopper 51 is simultaneously secured to the light main body 31. Thus, the reading light 1 can be assembled efficiently.

As described above, the fixing portions 42 of the plate spring 41 for pressing the light fitting 11 are fixed to the light main unit 31, with the stopper 15 held between them and the steps 36 of the main unit 31. Namely, the stopper 51 can be attached to the light main body 31 by a simple operation without using any particular components.

When the plate spring 41 is attached to the light main body 31 as describe above, the pressing portion 43 of the plate spring 41 is pressed by the back surface 17a of the light fitting 11 to be elastically deformed so that it slightly projects backward. In other words, the outer surface 12a of the light fitting 11 is pressed against the receiving/guiding portion 39 of the light main body 31 by the elastic deformation. Further, at this time, the contact member 47 attached to the central portion 43a of the plate spring 41 is urged against the back surface 17a of the light fitting 11 by the resilience of the plate spring 41.

Namely, in this state, the light fitting 11 is kept stationary in the light main body 31 by the frictional force exerted between the front edge 39a of the receiving/guiding portion 39 of the light main body 31, and the outer surface 12a of the light fitting 11 pressed against the front edge 39a, and also by the frictional force exerted between the back surface 17a of the light fitting 11 and the contact member 47 pressed by the back surface 17a. At this time, if the cylindrical portion 13 of the light fitting 11 is tilted by a force greater than those frictional forces, the light fitting 11 can be rotated through a desired angle and kept at the new position.

Lastly, the electrical cable 26 is routed as shown in FIG. 1, and the middle portion of the cable 26 is engaged with the electric cable fixing portion 44, using a cable stopper 65 (see FIGS. 1 and 3). The cable stopper 65 is used to fix the electrical cable 26 to the back of the arm 43d, and is, for example, a resin band.

When changing the orientation of the reading light 1 (light fitting 11) constructed as above, an operator applies an operation force greater than the above-mentioned frictional forces, exerted when the light fitting 11 is kept in a stationary state, to the cylindrical portion 13 of the light fitting 11 using the fingers. At this time, the outer surface 12a of the light fitting 11 slides along the front edge 39a of the receiving/guiding portion 39, and the back surface 17a of the light fitting 11 slides, kept in contact with the contact member 47 attached to the plate spring 41. Namely, the light fitting 11 is rotated always under the frictional forces. Therefore, if the fingers are taken off when the light fitting 11 has reached a desired position, the light fitting 11 is kept stationary at the position.

As described above, in the reading light 1 of the embodiment, the sliding portion (i.e., the outer surface 12a) of the light fitting 11 is formed of a resin, and the sliding portion (i.e., the front edge 39a) of the light main body 31 is formed of a metal. Similarly, the other sliding portion (i.e., the back surface 17a) of the light fitting 11 is formed of a resin, and the contact member 47 attached to the plate spring 41 is formed of a metal. This being so, the sliding portions smoothly slide relative to each other and are free from galling and frictional noise. Thus, the light fitting 11 can be rotated smoothly. In other words, the light fitting 11 has excellent operability. In general, the frictional coefficient between a metal and a resin is approx. 0.15.

In contrast, if the sliding portions are both formed of metals, their frictional coefficient is approx. 0.5, and if they are both formed of the same metal, their frictional coefficient is approx. 0.8 to 1.0. Thus, where a metal and a resin are slid on each other, the frictional coefficient is reduced to ¼ to ⅕, whereby smooth sliding is realized.

Further, such smooth sliding can be maintained over a long period of time, and hence excellent operability in changing the orientation of the light fitting 11 can be maintained over a long period of time.

The above-mentioned combination of the metal and the resin, employed at the sliding portions in the embodiment, is considered a best one. Namely, if the cylindrical portion 13 of the cover 12 of the light fitting 11, into contact with which the operator is brought most probable, should not be too much increased in temperature. Therefore, it is desirable to form the cover 12 of the light fitting 11 of a resin that is lower in thermal conductivity than metals. In light of this, it is preferable to form, of a metal, the light main body 31 that includes the receiving/guiding portion 39 kept in contact with the outer surface 12a of the cover 12. Further, by forming, of a metal, the light main body 31 substantially serving as the hull of the reading light 1, the heat emitted from the light source 20 can be prevented from being accumulated inside the light main body 31.

Further, since the light source 20 (LED) serving as a heat source is attached to the light fitting body 15 that forms the rear portion of the light fitting 11, the light fitting body 15 is heated to a maximum degree. This means that it is necessary to form the light fitting body 15 of a material that can efficiently dissipate heat. Accordingly, it is desirable to use a metal material. Since the light fitting body 15 is not exposed to a position at which it may contact the operator, there is no possibility of the operator being made to contact the light fitting body 15. Therefore, it is not necessary to form the same of a resin. Further, in the embodiment, the recesses 15a and 17b formed in the light fitting body 15 serve to enhance the effect of heat dissipation.

In contrast, the contact member 47 kept in contact with the back surface 17a of the light fitting body 15 is formed of a resin. This is because it is necessary to use a metal as the material of the plate spring 41 for pressing the light fitting 11, and when the light fitting body 15 is formed of a metal, it is necessary to interpose the contact member 47 of a resin between the plate spring 41 and the light fitting body 15. Namely, without the contact member 47, the metals slide on each other, thereby causing galling over time.

Although the embodiment employs the combination of a metal and a resin, the invention is not limited to this combination. For instance, where there is no necessity of heat dissipation, the light fitting body 15 may be formed of a resin. In this case, it is not necessary to interpose the resin contact member 47 between the light fitting body 15 and the metal plate spring 41. As a result, the number of components required for the reading light 1 is reduced to thereby reduce the manufacturing cost of the reading light 1.

Further, as described above, the front edge 39a of the receiving/guiding portion 39 contacts the outer surface 12a of the cover 12 of the light fitting 11, and slides relative thereto, with the result that the outer surface 12a gets filthy over time. In the embodiment, such stains are prevented from being seen from the front of the light fitting 11, by positioning, within the zone defined by angle β, the front edge 39a of the receiving/guiding portion 39 that supports the light fitting 11.

More specifically, by positioning the front edge 39a within the zone defined by angle β, stains on the outer surface 12a of the cover 12 are prevented from being seen through the gap defined between the inner peripheral surface 72a of the limiting ring 72 of the angle limiting unit 71, and the cylindrical portion 13 of the light fitting 11, even when the light fitting 11 is rotated through the maximum angle α1. As a result, the appearance of the reading light 1 is enhanced.

Furthermore, in the reading light 1 of the embodiment, since the light fitting body 15, to which the light source 20 as a heat source is attached, is formed of a metal, the heat produced by the light source 20 can be effectively dissipated. In particular, in the embodiment, since the light fitting 15 has, at its back, a heat dissipation structure formed of a plurality of recesses 15a and 17b, the light fitting body 15 can have a large surface area. Thus, by virtue of the recesses, the light fitting 11 can be made lightweight and can exhibit excellent heat dissipation performance.

In addition, the reading light 1 of the embodiment comprises the stopper 51 for limiting the movement of the cylindrical portion 13 to prevent permanent deformation of the plate spring 41, when the cylindrical portion 13 is strongly pushed backward by a user. When the light fitting 11 is pushed backward by an excessive force against the urging force of the plate spring 41, part of the spherical back surface of the light fitting body 15 is brought into contact with the stopper 51, whereby further backward movement of the light fitting 11 is stopped. The maximum quantity of backward movement of the light fitting 11 assumed at this time is indicated by distance L in FIG. 4. The distance L is constant regardless of the angle of the light fitting 11 and hence permanent deformation of the plate spring 41 can be reliably prevented, since the back surface 17a of the light fitting body 15 is part of a spherical surface.

When the light fitting 11 thus contacts the stopper 51, the plate spring 41 is deformed to the maximum. Namely, at this time, since the stopper 51 prohibits further movement of the light fitting 11, the plate spring 41 is prevented from being further deformed. In other words, to prevent the plate spring 41 from permanent deformation, it is sufficient if the maximum backward movement quantity L is set in accordance with the property of the plate spring 41.

In the embodiment, the attachment position of the stopper 51 is set at the position (indicated by distance L) at which the stopper 51 can prevent the plate spring 41 from permanent deformation. By locating the stopper 51 at this position, even after the plate spring 41 is deformed to the maximum, the light fitting 11 can be returned to its initial position when the pressing force applied thereto is released. By thus adjusting the attachment position of the stopper 51, the pressing force of the plate spring 41 is prevented from reducing over time, thereby maintaining the frictional force applied to the light fitting 11 at a constant value over a long period of time. As a result, the angle of the light fitting 11 can be changed reliably.

Yet further, since the stopper 51 is a ring member as shown in FIG. 3, it can reliably stop the light fitting 11, regardless of the orientation (angle) of the light fitting 11, and regardless of the direction in which the light fitting 11 is pushed. Alto, when the angle of the light fitting 11 is changed, kept in contact with the stopper 51, the stopper 51 functions to stabilize the center of rotation of the light fitting 11 to thereby make the angle changing operation smooth.

Moreover, in the reading light 1 of the embodiment, since the contact member 47 formed of a more flexible resin than that of the light fitting body 15 of the light fitting 11 is interposed between the pressing portion 43 of the plate spring 41 and the back surface 17a of the light fitting 11, the back surface 17a is prevented from direct contact with the plate spring 41 harder than the back surface 17a, and hence from abrasion. As a result, the frictional force applied to the light fitting 11 can be maintained at an appropriate value for a long period of time, thereby maintaining, at a substantially constant value, the force required to change the angle of the light fitting 11.

Although in the embodiment, the contact member 47 is attached to the plate spring 41, the invention is not limited to this. Alternatively, the contact member 47 may be attached to the back surface 17a of the light fitting body 15 of the light fitting 11.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For instance, although in the above-described embodiment, the receiving/guiding portion 39 of the light main body 31 is formed along the entire circumference of the main body 31, it may be divided into several circumferential portions. Three arcuate receiving/guiding portions 39, for example, may be provided at circumferentially regular intervals.

Further, although in the above-described embodiment, the receiving/guiding portion 39 of the light main body 31 and the other portions of the same are formed integral as one body, these portions may be formed as separate portions. In this case, for example, the receiving/guiding portion 39 is formed of a metal, and is bonded to a cylindrical body 31a that comprises an annular portion 32, arcuate walls 33 and a cylindrical wall 38 formed of a resin integral as one body.

Although in the above-described embodiment, the lens 22, for example, is provided in the cylindrical portion 13 projecting from the front end of the cover 12 of the light fitting 11, the invention is not limited to this. Alternatively, an opening for passing spot light therethrough may be directly formed in the outer surface 12a as a spherical portion, without forming the cylindrical portion 13. The light source 20 of the reading light 1 is not limited to a light emission diode, but may be formed of a lamp other than LEDs.

Although in the above-described embodiment, the angle limiting unit 71 for limiting the rotation of the light fitting 11 is formed as a member separate from the light main body 31, it may be formed integral with the latter as one body. In this case, the number of components providing the reading light 1 can be reduced, and the number of steps for assembling the reading light 1 can also be reduced.

What is claimed is:

1. A lighting apparatus comprising:
    a light fitting including a light source, a front portion with an outer surface, and a back portion with a back surface, the outer surface being a part of a spherical surface, the back surface being another part of the spherical surface;
    a receiving/guiding portion located in front of the light fitting, and receiving the light fitting, the receiving/guiding portion being in contact with the outer surface such that the light fitting is rotatable; and
    a spring which applies a pressing force to the back surface of the light fitting to press the outer surface of the light fitting against the receiving/guiding portion, the spring having a center portion from which a plurality of arms branch; and
    a resin contact member interposed between the back surface and the center portion of the spring,
    wherein:
    the back portion is formed of a metal; and
    one of the receiving/guiding portion and the front portion of the light fitting is formed of a metal, and the other of the receiving/guiding portion and the front portion of the light fitting is formed of a resin.

2. The lighting apparatus according to claim 1, further comprising a ring-like stopper which limits a movement of the light fitting before the spring is deformed permanently, when the light fitting is moved backward against the pressing force of the spring,
    wherein:
    the stopper is not in contact with the back surface when the light fitting is rotated, and is in contact with the light fitting to limit the movement of the light fitting when the light is moved backward.

3. The lighting apparatus according to claim 1, further comprising:
    an angle limiting unit which covers at least part of the outer surface and the receiving/guiding portion, the angle limiting unit limiting a range of rotation of the light fitting within a zone defined by a preset angle,
    and wherein:
    the receiving/guiding portion is arranged in a position in which portions of the outer surface which slide on the receiving/guiding portion when the light fitting is rotated within the zone defined by the preset angle, are prevented from being seen from a front of the lighting apparatus, regardless of an angle of the light fitting.

* * * * *